Figures 1, 2:
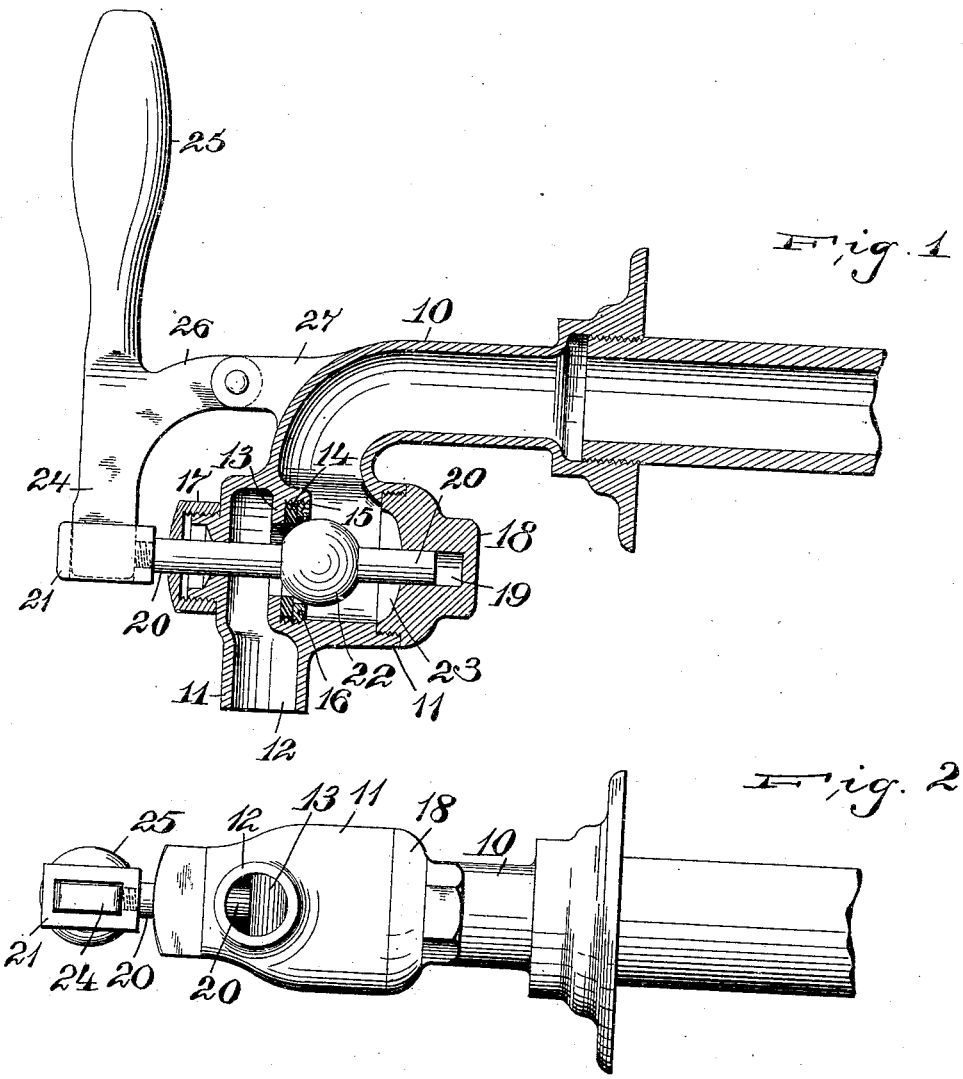

R. BELL.
FAUCET.
APPLICATION FILED SEPT. 3, 1907.

931,252.

Patented Aug. 17, 1909.

WITNESSES:
E. A. Bell
S. A. Rogers.

INVENTOR
Robert Bell,
BY
Wm. H. Caufield.
ATTORNEY

UNITED STATES PATENT OFFICE.

ROBERT BELL, OF BLOOMFIELD, NEW JERSEY.

FAUCET.

No. 931,252.　　　Specification of Letters Patent.　　Patented Aug. 17, 1909.

Application filed September 3, 1907. Serial No. 391,003.

*To all whom it may concern:*

Be it known that I, ROBERT BELL, a citizen of the United States, residing at Bloomfield, in the county of Essex and State of New Jersey, have invented certain new and useful Improvements in Faucets; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved faucet that is economically manufactured, and one that uses no springs, the current, or pressure of the current, of the liquid which is dispensed, being utilized to hold the valve open and to hold it shut, the valve being manually operated to change its position.

The invention further consists of a novel form of valve and stem, and the method of mounting the stem in the casing of the faucet.

The invention is illustrated in the accompanying drawings, in which—

Figure 1 is a vertical central section of the improved faucet, and Fig. 2 is a bottom view of the same.

The faucet comprises a casting forming a casing 10 which is provided with a right angled portion 11, and has on the end thereof a spout 12. Extending across the casing is a partition 13, which forms a valve seat, the washer 14 being held thereon by means of the screw-threaded ring 15, which is provided with recesses 16 for the reception of a spanner wrench or screw-driver. In line with the valve seat is a stuffing box 17, and on the other side of the casing is a nut 18, screwed into the casing and having a recess 19.

A valve stem 20 has one end in the recess 19 and passes through the valve seat, and has its other end projecting from the stuffing box and provided with a slotted head 21. A ball 22 is suitably placed on the stem 20, and is either made of rubber, or elastic material, or is made integral with the stem of metal such as brass. Fitting in the slotted head 21 is a part 24 of a handle 25, which has a transverse arm 26 pivoted in the standard 27 on the casing of the faucet. In this device there are no springs employed to close the faucet, the faucet remaining open or remaining closed, according as it was left at the last manual operation. When the faucet is closed it is held so by the pressure of the liquid being dispensed, the ball being securely held against the valve seat. When the faucet is opened, the ball retreats in the cup-shaped hollow portion 23 of the nut 18, and is thus removed far enough away from the current to be held open thereby, and the faucet stays open or shut as desired, but at the same time uses no spring.

Having thus described my invention what I claim is:—

1. A faucet comprising a casing curved at its end and provided with a right-angled portion and a spout, a standard in extension of the casing, a handle pivoted in the standard, a valve seat extending across the right-angled portion, a stem passing through the valve seat and the front of the right-angled portion, an operative connection between the handle and the stem, a ball on the stem adapted to engage the valve seat, and a nut on the right-angled portion adapted to receive the inclosed end of the stem, the nut being cup-shaped on its inner face to receive the ball.

2. A faucet curved at its end and provided with a right-angled portion and a spout, a standard in extension of the casing, a T-shaped handle pivoted on its end in the standard, a valve seat extending across the right-angled portion, a washer on the valve seat, a ring on the washer to lock it on the valve seat, a valve stem in the right-angled portion and passing through the valve seat and projecting on one end from the right-angled portion, an operative connection between the handle and the end of the stem, a ball on the stem adapted to engage the washer on the valve seat, and a nut on the right-angled portion being recessed to receive the inclosed end of the stem, the nut being cup-shaped on its inner face to receive the ball.

In testimony that I claim the foregoing, I have hereunto set my hand this 31st day of August, 1907.

ROBERT BELL.

Witnesses:
　WM. H. CAMFIELD,
　E. A. PELL.